United States Patent
Banks et al.

(10) Patent No.: US 8,495,127 B2
(45) Date of Patent: Jul. 23, 2013

(54) IMPROVING SCALABILITY AND THROUGHPUT OF A PUBLISH/SUBSCRIBE NETWORK

(75) Inventors: Andrew David James Banks, Romsey (GB); Gavin David Beardall, Alresford (GB); Paul Stephen Dennis, Southampton (GB); Adrian David Dick, Southampton (GB); Ian Charles Vanstone, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 12/239,430

(22) Filed: Sep. 26, 2008

(65) Prior Publication Data

US 2010/0082748 A1   Apr. 1, 2010

(51) Int. Cl.
*G06F 15/16* (2006.01)
(52) U.S. Cl.
USPC ............ 709/201; 709/203; 709/206; 709/207
(58) Field of Classification Search
USPC ......................................... 709/201, 202, 203
See application file for complete search history.

(56) References Cited

U.S. PATENT DOCUMENTS

| | | | |
|---|---|---|---|
| 6,336,119 B1 * | 1/2002 | Banavar et al. | 1/1 |
| 6,338,092 B1 * | 1/2002 | Chao et al. | 709/236 |
| 6,728,715 B1 | 4/2004 | Astley et al. | |
| 7,130,891 B2 * | 10/2006 | Bernardin et al. | 709/218 |
| 7,283,463 B2 | 10/2007 | Miller et al. | |
| 7,706,895 B2 * | 4/2010 | Callaghan | 700/17 |
| 7,796,607 B2 * | 9/2010 | Gerber et al. | 370/395.31 |
| 7,801,030 B1 * | 9/2010 | Aggarwal et al. | 370/228 |
| 2003/0018621 A1 * | 1/2003 | Steiner et al. | 707/3 |
| 2003/0115317 A1 * | 6/2003 | Hickson et al. | 709/224 |
| 2003/0212763 A1 * | 11/2003 | Kashyap | 709/219 |
| 2004/0001498 A1 | 1/2004 | Chen et al. | |
| 2005/0015619 A1 * | 1/2005 | Lee | 713/201 |
| 2005/0021594 A1 * | 1/2005 | Bernardin et al. | 709/200 |
| 2005/0053013 A1 * | 3/2005 | Traylor et al. | 370/254 |
| 2005/0055382 A1 * | 3/2005 | Ferrat et al. | 707/201 |
| 2005/0060202 A1 * | 3/2005 | Taylor et al. | 705/2 |
| 2005/0086285 A1 * | 4/2005 | Balasubramanian et al. | 709/200 |
| 2006/0224668 A1 | 10/2006 | Ginis | |
| 2008/0005562 A1 * | 1/2008 | Sather et al. | 713/168 |
| 2008/0082539 A1 * | 4/2008 | Doane et al. | 707/9 |

(Continued)

OTHER PUBLICATIONS

Parzyjegla, Helge, Gero Muehl and Michael A. Jaeger. "Reconfiguring Publish/Subscribe Overlay Topologies" Proceedings of the 26th IEEE International Conference on Distributed Computing Systems Workshops (ICDCSW'06); 2006.

(Continued)

*Primary Examiner* — Dhairya A Patel
(74) *Attorney, Agent, or Firm* — Marcia L. Doubet (57) ABSTRACT

Improving scalability and throughput in publish/subscribe messaging systems by allowing the spoke systems to vary the member of the hub collective that it attaches to. The scalability is improved because the spoke systems do not have to have a long lasting attachment to a specific hub system. Instead, the spoke systems can be redistributed more evenly when new spoke systems are added or removed. The throughput is increased by distributing workload and fan-out responsibilities within hub collectives. Availability is improved because single points of failure are removed. Ease of administration is also improved over a hierarchy by allowing child nodes to automatically change parent nodes if a parent node is modified or removed.

20 Claims, 6 Drawing Sheets

U.S. PATENT DOCUMENTS

2009/0109869 A1* 4/2009 Hsiao et al. .................. 370/254
2009/0129383 A1* 5/2009 Maalouf et al. ............... 370/390
2009/0183175 A1* 7/2009 Walker et al. ................. 719/313
2009/0304004 A1* 12/2009 Huynh Van et al. ..... 370/395.31
2010/0008253 A1* 1/2010 Mellachervu et al. ........ 370/254

OTHER PUBLICATIONS

Cugola, Gianpaolo, Gian Pietro Picco and Amy L. Murphy. "Towards Dynamic Reconfiguration of Distributed Publish-Subscribe Middleware" Third International Workshop on Software Engineering and Middleware; 2002.

* cited by examiner

IMPROVING SCALABILITY AND THROUGHPUT OF A PUBLISH/SUBSCRIBE NETWORK

FIELD OF THE INVENTION

The present disclosure relates generally to the field of computer network communication, and more particularly to improving scalability and throughput of a publish/subscribe network.

BACKGROUND

Publish/subscribe messaging is a form of asynchronous computer network messaging where publishers post messages and subscribers specify categories of messages they want to receive. Publish/subscribe messaging systems utilize message brokers to filter the messages and forward them to the subscribers.

One example of an existing publish/subscribe messaging system consists of a fully interconnected collective where groups of message brokers forward messages from publishers to subscribers within that collective. The subscribers register a subscription with a message broker and the message broker registers a matching subscription with neighboring message brokers. The matching subscription is referred to as a proxy-subscription. This proxy-subscription allows the message broker to forward messages to other message brokers that attach to a subscriber.

Another example of an existing publish/subscribe messaging system is a hierarchy. A publish/subscribe hierarchy consists of parent/child relationships between the message brokers but without the loop of a fully interconnected system. When a "parent" message broker receives a message from a publisher, that parent forwards the message to each of its "child" message brokers. Each child then forwards the message on to each of its child brokers and to any subscribers of that message type that are connected to that child. One limitation of a publish/subscribe hierarchy is that looping messages are not prevented by the architecture alone. Messages may pass through an arbitrary number of message brokers before reaching a subscriber if there is an error in the configuration.

Existing publish/subscribe messaging systems can be constructed as a hub and spoke network with a collective of message brokers, commonly referred to as hubs, at the hub collective and a set of child spokes, wherein each child treats a fixed member of the hub collective as its parent. The scalability of the hub collective is increased over this form of hierarchy by allowing multiple systems to operate as a hub.

When publish/subscribe systems are grouped together in a collective and share proxy-subscriptions, any publishing hub has to forward the message to all subscribing hubs. If there are a large number of subscribers, then the load that this requirement imposes on the publishing hub will limit the scalability of the collective.

What is needed is a publish/subscribe messaging system that allows for greater scalability by balancing the load and greater availability by eliminating the single hub as the single point of failure.

SUMMARY

The present invention provides systems and methods for improving scalability and throughput in publish/subscribe messaging systems by allowing the spoke systems to vary the member of the hub collective that it attaches to.

An aspect of the present invention provides a method for publish/subscribe messaging. This method includes the steps of attaching a publish/subscribe spoke system to a first publish/subscribe message broker within a group of publish/subscribe message brokers; removing the attachment of the publish/subscribe spoke system from the first publish/subscribe message broker within the group of publish/subscribe message brokers; and automatically attaching the publish/subscribe spoke system to a second publish/subscribe message broker within the group of publish/subscribe message brokers where the second publish/subscribe message broker includes a preferred publish/subscribe message broker.

Another aspect of the present invention provides a system for publish/subscribe messaging. This system includes a group of publish/subscribe message brokers; and publish/subscribe spoke systems attached to a publish/subscribe message broker within the group of publish/subscribe message brokers allowing message transfer between the group of publish/subscribe message brokers and the publish/subscribe spoke systems, wherein each of the publish/subscribe spoke systems can vary which publish/subscribe message broker of the group of publish/subscribe message brokers that a publish/subscribe spoke system is attached to.

DETAILED DESCRIPTION OF EXEMPLARY EMBODIMENTS

The present invention provides systems and methods for improving scalability and throughput in publish/subscribe messaging systems by allowing the spoke systems to vary the member of the hub collective that it attaches to. The scalability is improved because the spoke systems do not have to have a long lasting attachment to a specific hub system. Instead, the spoke systems can be redistributed more evenly when new spoke systems are added or removed. The throughput is increased by distributing workload and fan-out responsibilities within hub collectives. Availability is improved because single points of failure are removed. Ease of administration is also improved over a hierarchy by allowing child nodes to automatically change parent nodes if a parent node is modified or removed.

Turning now to the drawings, in which like numerals indicate like elements throughout the figures, exemplary embodiments of the invention are described in detail.

Figure 1:
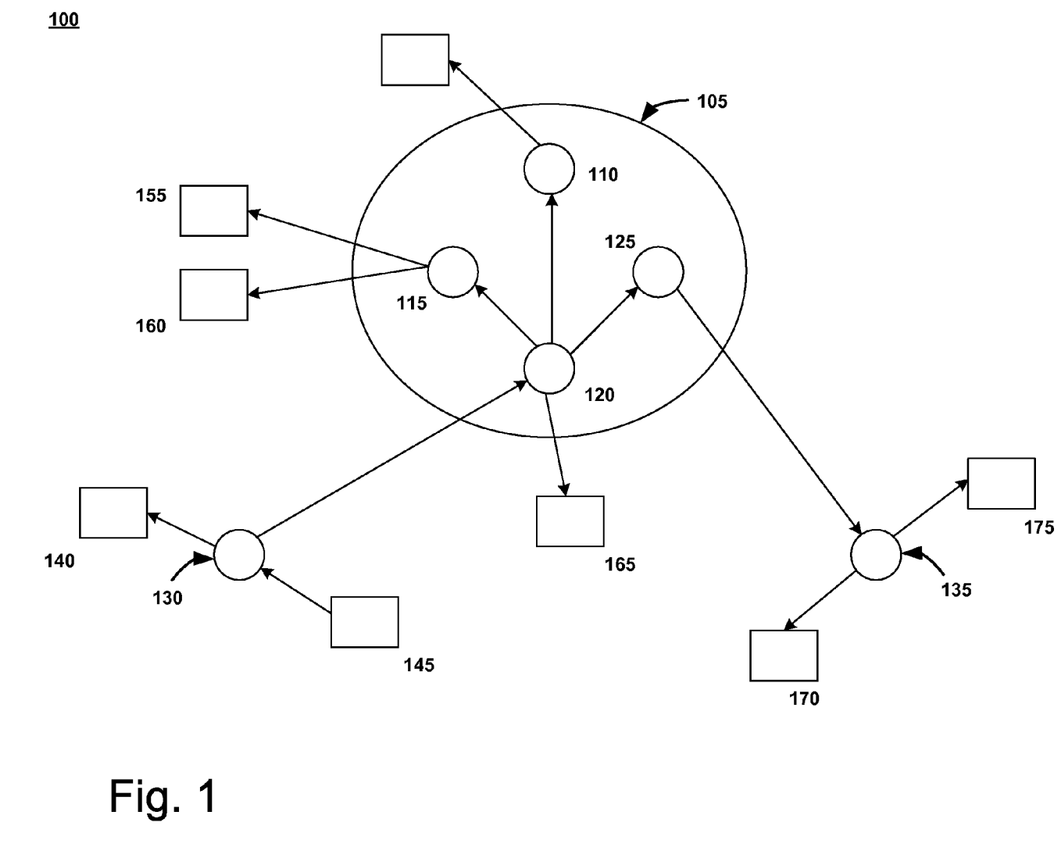
FIG. 1 depicts a hub and spoke publish/subscribe messaging system in accordance with an exemplary embodiment of the present invention.

FIG. 1 depicts a hub and spoke publish/subscribe messaging system 100 in accordance with an exemplary embodiment of the present invention. Referring to FIG. 1, a hub collective 105 includes four hubs, 110, 115, 120, and 125. The collective 105 is attached to spoke system 130 and spoke system 135. Spoke system 130 is attached to a subscriber 140 and a publisher 145. Spoke system 135 is attached to two subscribers 170 and 175. Each hub within the collective 105 can be attached to individual publishers and individual subscribers. For example, hub 115 is attached to subscriber 155 and subscriber 160.

For the purpose of this application, when a spoke system is attached to a hub, the spoke system can send messages to the hub, or the spoke system can receive messages from the hub, or the spoke system can both send messages to and receive messages from the hub.

Although in this exemplary embodiment there is one collective comprising four hubs and the collective is attached to two spoke systems, there could be any number of collectives wherein each collective comprises any number of hubs and each collective attaches to any number of spoke systems.

Each hub system 110, 115, 120, and 125 and each spoke system 130 and 135 is identified by an identifier, such as a Universally Unique Identifier (UUID), that is generated when the system is created. The identity and network address of all hub systems 110, 115, 120, and 125 is known to all hub systems 110, 115, 120, and 125 and to all spoke systems 130 and 135. Additionally, the identity and network address of all spoke systems 130 and 135 is known to all of the hub systems 110, 115, 120, and 125. Because the spoke systems 130 and 135 do not communicate directly with each other, the spoke systems 130 and 135 do not need to know the identity or network address of other spoke systems 130 and 135.

When a subscriber 155 is created at a hub system 115, a proxy subscription is sent to each other hub 110, 120, and 125 within the collective 105. When a publisher 145 is created at a spoke system 130, the spoke 130 may choose a preferred hub 120 by determining the subset of hubs 110, 115, 120, and 125 that are currently available and computing the remainder of its UUID hashcode and the number of reachable hubs 110, 115, 120, and 125. The remainder is the index of the chosen hub 120 in the ordered list of UUIDs. In one exemplary embodiment of the present invention, the syntax is: chosenHub=hubList[UUID.HashCode( ) % numberOfHubs];.

After a preferred hub 120 is chosen, the spoke 130 sends a proxy subscription to the preferred hub 120. When the preferred hub 120 receives the proxy subscription, the preferred hub 120 forwards the proxy subscription to all other hubs 110, 115, and 125 in the hub collective 105. If any of the other hubs 110, 115, and 125 within the collective 105 are unavailable, the proxy subscription is queued for later transmission.

When a message is created by publisher 145, it is sent to the hub of spoke 130. The hub of spoke 130 forwards the message to each of its local subscribers 140 and to the member hub 120 of the hub collective 105 that it is attached to. In this exemplary embodiment, the spoke 130 sends messages to the same hub 120 that the spoke system 130 receives messages from. Alternatively, the spoke system 130 could send messages to a different hub than the hub 120 that it receives messages from, such as hub 115. Although in the exemplary embodiment there is only one local subscriber 140 attached to spoke 130, there could be multiple local subscribers and multiple local publishers attached to spoke 130.

When the message is received by a hub 120, the message is forwarded to each local subscriber 165. The message is also forwarded to all hubs within the collective 105, and each copy of the message includes a label containing the range of UUIDs of spokes that the receiving hub should forward the message to. Because the label contains a range and not a list of the actual UUIDs of the actual spokes, the additional data in the message is small irrespective of the number of spokes. After receiving the message, each hub within the collective 105 then forwards the message to each of that hub's local subscribers and to the subset of spokes whose UUID is contained in the range of UUIDs in the message label. In this exemplary embodiment, hub 125 would receive the message from hub 120 with a label that contains the UUID of spoke 135 within the range of UUIDs. The hub 125 sends the message to spoke 135 and spoke 135 forwards the message to each of the attached subscribers 170, 175.

In one exemplary embodiment, the subset of spokes assigned to a particular hub within a hub collective 105 may be computed by first determining the subset of available hubs including that particular hub. The range of spoke UUID hashcodes may then be divided up so that each available hub within the collective receives a portion of the UUID space. All of the available hubs within the collective may order the spoke UUIDs in the same way so that, as long as the complete range of UUIDs is assigned, then each spoke is serviced by exactly one hub.

Each hub within the hub collective 105 is responsible for distributing the message to each of the spokes that are assigned thereto. If the hub within the collective 105 is unavailable when a message is being transmitted, the message may be queued for later transmission with no assignment of spokes. As such, the message delivery may proceed even if the preferred hub is unavailable.

If a subscriber attached to a spoke requires strict message ordering, the hub within the hub collective 105 that receives the message from a spoke or publisher may distribute the message to all spokes directly.

Because all of the hubs in a hub collective 105 calculate the subset of the spokes each hub is responsible for in the same deterministic way, the hubs tend to communicate with a fixed subset of spokes and only one hub tends to communicate with each spoke. If the preferred hub within the hub collective fails, then the spoke may choose another hub within the collective 105 as long as that spoke does not require strict message ordering. Similarly, if a hub is added to or removed from the collective 105, the spokes may move to a different hub within the collective 105 if that spoke can tolerate a break in message ordering. Each spoke system can move from hub to another while the spoke system is active. Because the messages can contain a label with a range of UUIDs instead of a list of actual UUIDs for the actual spokes that the hub should forward the message to, the population of spokes can change as the message is sent. The redistribution of spokes amongst the hubs in a collective is detailed below in reference to FIGS. 4 and 6.

Figure 2:
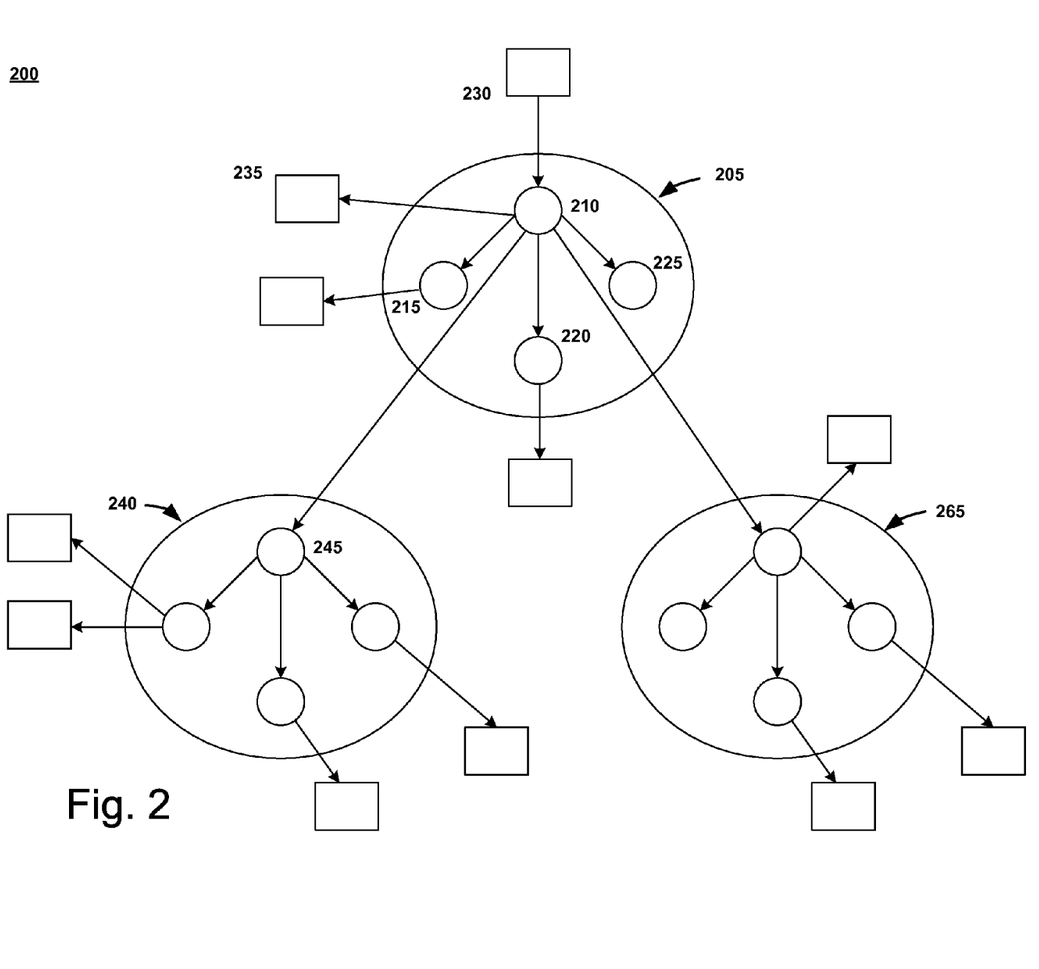
FIG. 2 depicts a late fan-out hub and spoke publish/subscribe messaging system in accordance with an exemplary embodiment of the present invention.

The present invention can be extended so that the spoke systems can be hub collectives. FIG. 2 depicts a late fan-out hub and spoke publish/subscribe messaging system 200 in accordance with an exemplary embodiment of the present invention. In a late fan-out publish/subscribe messaging system, each hub collective has similar capability and are able to handle the load of forwarding messages to a select number of other systems. The work of forwarding messages to subscribers is distributed amongst the members of the collective rather than being solely the responsibility of the publishing system.

Referring to FIG. 2, a hub collective 205 includes four hubs, 210, 215, 220, and 225. The collective 205 is attached to spoke system 240 and spoke system 265, both of which are hub collectives that comprise four hubs each. Each hub within each spoke system hub collective can have any number of publishers and subscribers. In this exemplary embodiment, a spoke that is attached to a hub sends messages to and receives messages from the hub that it is attached to.

When a message is created by a publisher 230 that is attached to a hub collective 205, the message is forwarded to a hub 210 within hub collective 205. When a hub 210 within a collective 205 receives a message, the hub 210 forwards the message to all hubs within the collective 205 and to each local subscriber 235 of the hub 210. Each hub within the collective 205 forwards the message to each of the hub's local subscribers.

If the proxy subscription within the receiving hub 210 is from a different collective 240, the message is forwarded to a preferred hub 245 of the second collective 240. The hubs within the second collective 240 then forward the message in the same way that the hubs within the collective 205 did; the receiving hub 245 forwards the message to each hub within the collective 240 and to any local subscribers of the hub 245, then each hub within the second collective 240 forwards the message to each of the hub's local subscribers.

In one exemplary embodiment, when a member of a spoke system hub collective 240 creates a message, the hub within the spoke system hub collective 240 that received the message may forward the message to each hub within the spoke system hub collective 240 and a preferred hub 245 of the spoke system hub collective 240 may forward the message to a preferred hub 210 of the hub collective 205.

Figure 3:
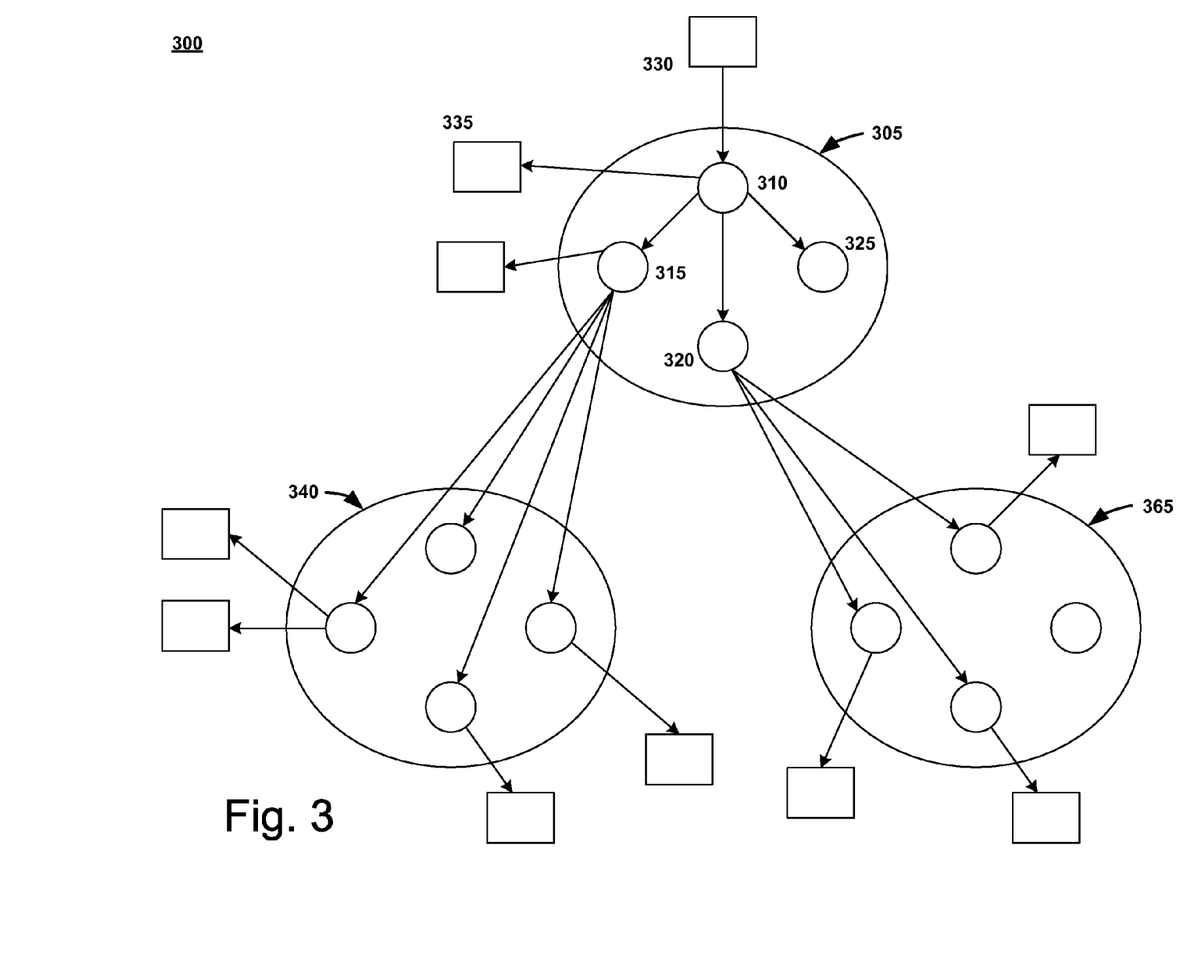
FIG. 3 depicts an early fan-out hub and spoke publish/subscribe messaging system in accordance with an exemplary embodiment of the present invention.

FIG. 3 depicts an early fan-out hub and spoke publish/subscribe messaging system 300 in accordance with an exemplary embodiment of the present invention. In an early fan-out publish/subscribe messaging system, some hub collectives have more capability than the rest of the collectives. Referring to FIG. 3, collective 305 is the more powerful collective whereas collective 340 and collective 365 are less powerful.

Powerful hub collective 305 includes four hubs, 310, 315, 320, and 325. The collective 305 is attached to less powerful spoke system 340 and less powerful spoke system 365, both of which are hub collectives that include four hubs each. Each hub within each spoke system hub collective can have any number of publishers and subscribers. In this exemplary embodiment, a spoke that is attached to a hub sends messages to and receives messages from the hub that it is attached to.

When a message is created by a publisher 330 that is attached to a hub collective 305, the message is sent to a hub 310 within hub collective 305. When a hub 310 within a collective 305 receives a message, the hub 310 forwards the message to all hubs within the collective 305 and to each local subscriber 335 of the hub 310. Each hub within the collective 305 forwards the message to each of the hub's local subscribers.

If the proxy subscription within the receiving hub 310 is from a different collective 340, each member of the collective 305 forwards the message to assigned portions of other collectives. In this example, a hub 315 within collective 305 is assigned to forward messages to each hub within a collective 340 and a hub 320 within collective 305 is assigned to forward messages to each hub within a collective 365. Alternatively, hub 325 of collective 305 could have been assigned a portion of collective 365. Each hub within the less powerful collectives 340 and 365 are then only responsible for forwarding messages to the hub's local subscribers.

In one exemplary embodiment, when a member of a less powerful collective 340 creates a message, the hub within the less powerful collective 340 that received the message may forward the message to each hub within the less powerful collective 340 and to a preferred hub 315 of the more powerful collective 305.

An example of a low fan-out publisher/subscriber message system may be a head office sending pricing information to its stores. The store systems may not have enough capacity to fan out the message to other stores, so a late fan-out system may not work. However, if the head office has more powerful systems, the head office's systems can do the work using an early fan-out system.

Figure 4:
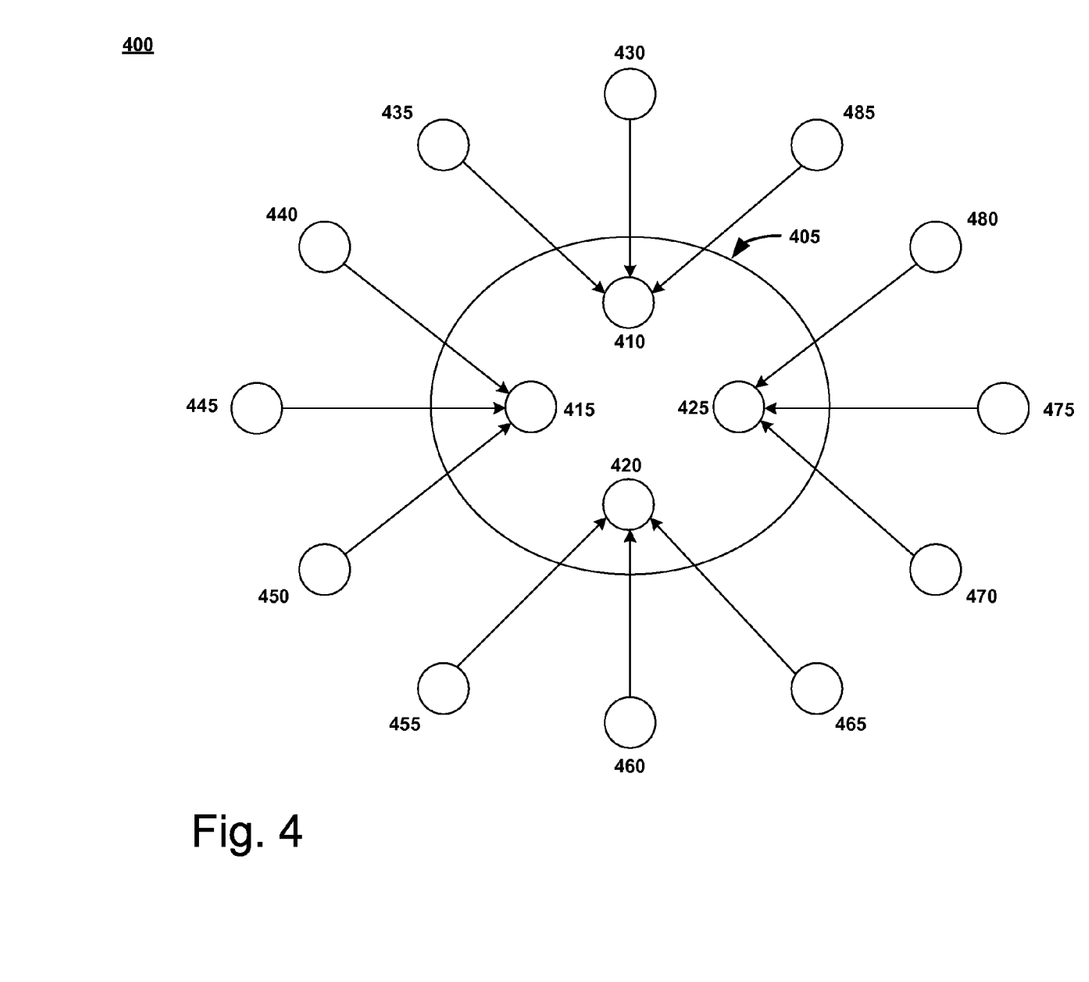
FIG. 4 depicts a hub and spoke publish/subscribe messaging system with evenly distributed spokes in accordance with an exemplary embodiment of the present invention.

FIG. 4 depicts a hub and spoke publish/subscribe messaging system 400 with evenly distributed spokes in accordance with an exemplary embodiment of the present invention. Referring to FIG. 4, a hub collective 405 includes four hubs 410, 415, 420, and 425, and each hub includes three spoke systems. Hub 410 is attached to spokes 430, 435, and 485; hub 415 is attached to spokes 440, 445, and 450; hub 420 is attached to spokes 455, 460, and 465; and hub 425 is attached to spokes 470, 475, and 480. In this exemplary embodiment, a spoke that is attached to a hub sends messages to and receives messages from the hub that it is attached to.

As mentioned above in connection with FIG. 1, the spoke systems may choose a preferred hub within a hub collective by determining the subset of hubs that are currently available and computing the remainder of its UUID hashcode and the number of reachable hubs. The remainder is the index of the chosen hub in the ordered list of UUIDs. Using this method, the spokes tend to be distributed evenly amongst the hubs within the hub collective. If the topology changes, the spoke systems may change the hub to which it is attached to. For example, when a hub becomes unavailable, the spoke systems that send messages to the unavailable hub will choose another hub to send messages to. Spoke systems that were previously sending messages to available hubs may choose other hubs within the hub collective based on the above calculation after the spoke systems that were sending messages to the unavailable hub are redistributed. Because all hubs within a hub collective are kept informed as to the complete set of hubs, when a hub becomes unavailable, the publication load can be redistributed. For example, if a hub that sends messages to a spoke system becomes unavailable, another hub may attach to that spoke system to complete the message delivery.

Figure 5:
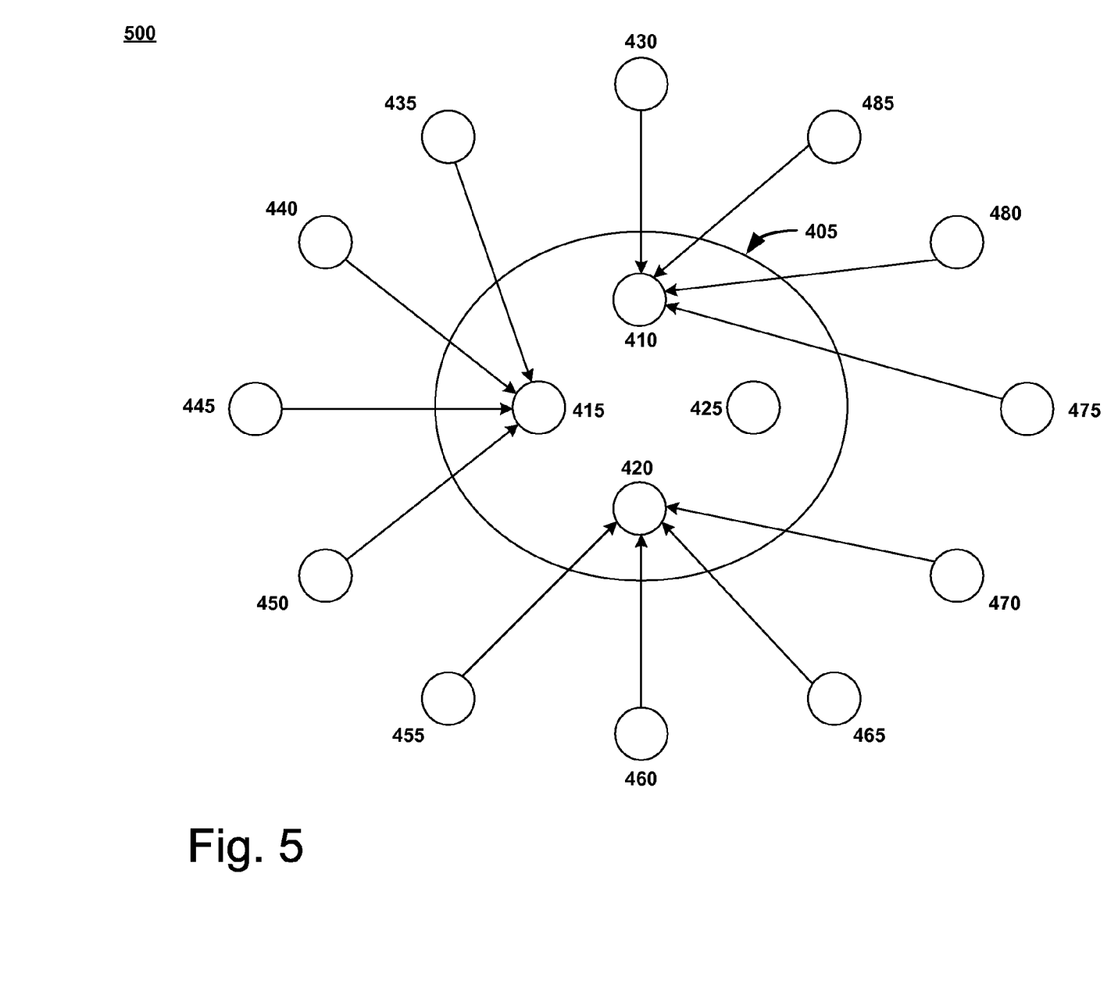
FIG. 5 depicts a hub and spoke publish/subscribe messaging system with an unavailable or removed hub in accordance with an exemplary embodiment of the present invention.

FIG. 5 depicts a hub and spoke publish/subscribe messaging system 500 with an unavailable or removed hub in accordance with an exemplary embodiment of the present invention. Referring to FIG. 5, if a hub 425 within the hub collective 405 becomes unavailable or is removed from the hub collective 405, the spoke systems may be redistributed so that there are approximately the same number of spoke systems at each available hub within the hub collective 405.

In this example, the spoke systems are redistributed evenly. Spoke system 475 and spoke system 480 that were attached to the unavailable hub 425 are now attached to hub 410. Spoke system 470 that was attached to the unavailable hub 425 is now attached to hub 420. To accommodate the shifting of spokes from the unavailable hub 425, spoke 435 moved from hub 410 to hub 415. In another exemplary embodiment, a hub may be added (not shown) to the hub collective 405. When a hub is added to the collective 405, some of the spoke systems may move from the hub that they are attached to the new hub.

Figure 6:
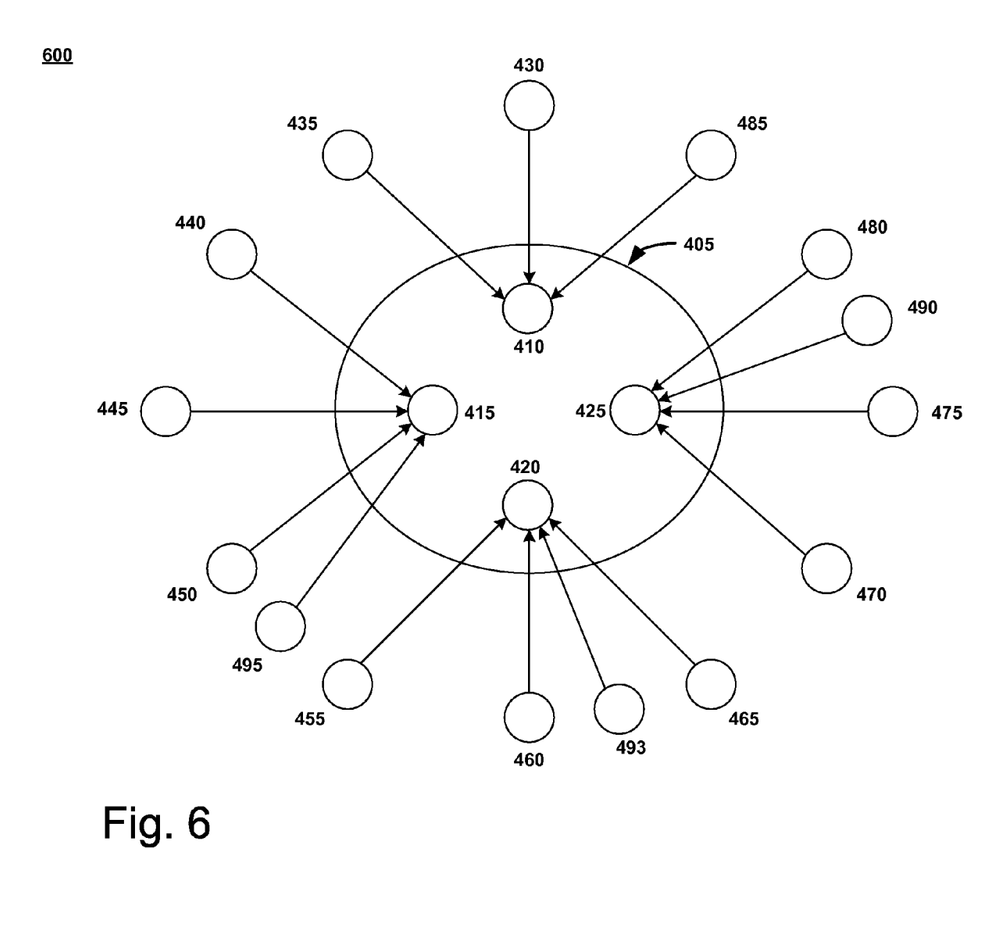
FIG. 6 depicts a hub and spoke publish/subscribe messaging system with additional spokes added in accordance with an exemplary embodiment of the present invention.

FIG. 6 depicts a hub and spoke publish/subscribe messaging system 600 with additional spokes added in accordance with an exemplary embodiment of the present invention. When a spoke system is added to a collective, the spoke system chooses a preferred hub to send messages to in the same way as described above in connection with FIG. 1. The spoke systems that were previously sending messages to a hub within the hub collective may move to another hub to more evenly distribute the load. Because all hubs within a hub collective are kept informed as to the complete set of hubs, the hubs may redistribute the spoke systems for sending messages to the spoke systems.

Referring to FIG. 6, if spoke systems 490, 493, and 495 are added to a hub collective 405, the spoke systems may be redistributed so that there are approximately the same number of spoke systems at each available hub within the hub collective 405. In this example, new spoke system 490 is attached to hub 425; new spoke system 493 is attached to hub 420; and new spoke system 495 is attached to 415. In this exemplary embodiment, a spoke that is attached to a hub sends messages to and receives messages from the hub that it is attached to. This embodiment is only one of many examples of how the spoke systems may be distributed throughout the hub collective 405.

One of ordinary skill in the art would appreciate that the present invention provides for improving scalability and throughput in publish/subscribe messaging systems by allowing the spoke systems to vary the member of the hub collective that it attaches to. Those skilled in the art will appreciate that the present invention is not limited to any specifically discussed application and that the embodiments described herein are illustrative and not restrictive. From the description of the exemplary embodiments, equivalents of the elements shown therein will suggest themselves to those skilled in the art, and ways of constructing other embodiments of the present invention will suggest themselves to practitioners of the art. Therefore, the scope of the present invention is to be limited only by the claims that follow.

What is claimed is:

1. A method for publish/subscribe messaging, comprising:
attaching a publish/subscribe spoke system to a first publish/subscribe message broker within a hub collective comprising a plurality of publish/subscribe message brokers;
removing the attachment of the publish/subscribe spoke system from the first publish/subscribe message broker within the hub collective;
selecting a second publish/subscribe message broker from available publish/subscribe message brokers within the hub collective, further comprising:
determining a total number of the available publish/subscribe message brokers within the hub collective;
determining a range of Universally Unique Identifier (UUID) hashcodes of publish/subscribe spoke systems attached to the available publish/subscribe message brokers within the hub collective, the range comprising a lowest value of the UUID hashcodes through a highest value of the UUID hashcodes;
computing a distribution of the range of UUID hashcodes over the determined total number of the available publish/subscribe message brokers within the hub collective, the distribution computed so as to attach on average an identical number of publish/subscribe spoke systems to each of the available publish/subscribe message brokers; and
selecting one of the available publish/subscribe message brokers to which the UUID hashcode of the publish/subscribe spoke system is distributed, by the computing, to become the second publish/subscribe message broker; and
automatically attaching the publish/subscribe spoke system to the second publish/subscribe message broker within the hub collective.

2. The method of claim 1, wherein the publish/subscribe spoke system is active when the attachment of the publish/subscribe spoke system is removed from the first publish/subscribe message broker.

3. The method of claim 1, wherein the publish/subscribe spoke system is active when the publish/subscribe spoke system is attached to the second publish/subscribe message broker.

4. The method of claim 1, wherein removing the attachment and selecting the second publish/subscribe message broker occur responsive to a publish/subscribe message broker within the hub collective becoming unavailable.

5. The method of claim 1, wherein removing the attachment and selecting the second publish/subscribe message broker occur responsive to an additional publish/subscribe spoke system being attached to a publish/subscribe message broker within the hub collective.

6. The method of claim 1, wherein removing the attachment and selecting the second publish/subscribe message broker occur responsive to one of the publish/subscribe spoke systems becoming unattached from a publish/subscribe message broker within the hub collective.

7. A system for publish/subscribe messaging, comprising:
a hub collective comprising a plurality of publish/subscribe message broker computer devices, each publish/subscribe message broker computer device being communicably coupled to each other publish/subscribe message broker computer device in the hub collective; and
a plurality of publish/subscribe spoke system computer devices each communicably attached to at least one of the publish/subscribe message broker computer devices, allowing message transfer between the publish/subscribe message broker computer devices and the publish/subscribe spoke system computer devices,
wherein each of the publish/subscribe spoke system computer devices is operable to vary which publish/subscribe message broker computer device the publish/subscribe spoke system computer device is communicably attached to, and
wherein the publish/subscribe spoke system computer devices select a publish/subscribe message broker computer device to communicably attach to, further comprising using a processor of a computing system to execute instructions comprising:
determining a total number of available publish/subscribe message broker computer devices within the hub collective;
determining a range of Universally Unique Identifier (UUID) hashcodes of publish/subscribe spoke system computer devices attached to the available
publish/subscribe message broker computer devices within the hub collective, the range comprising a lowest value of the UUID hashcodes through a highest value of the UUID hashcodes;
computing a distribution of the range of UUID hashcodes over the determined total number of the available publish/subscribe message broker computer devices within the hub collective, the distribution computed so as to attach on average an identical number of publish/subscribe spoke system computer devices to each of the available publish/subscribe message broker computer devices; and
attaching each of the publish/subscribe spoke system computer devices to one of the available publish/subscribe message broker computer devices to which the UUID hashcode of the publish/subscribe spoke system computer device is distributed by the computing.

8. The system of claim 7, wherein each publish/subscribe spoke system computer device is operable to vary which publish/subscribe message broker computer device the publish/subscribe spoke system computer device is communicably attached to while the publish/subscribe spoke system computer device is active.

9. The system of claim 7, wherein selecting the publish/subscribe message broker computer device to communicably attach to occurs responsive to one of the publish/subscribe message broker computer devices becoming unavailable.

10. The system of claim 7, wherein selecting the publish/subscribe message broker computer device to communicably attach to occurs responsive to an additional publish/subscribe spoke system computer device being communicably attached to one of the publish/subscribe message broker computer devices.

11. The system of claim 7, wherein selecting the publish/subscribe message broker computer device to communicably attach to occurs responsive to one of the plurality of publish/subscribe spoke system computer devices detaching from one of the publish/subscribe message broker computer devices in the hub collective.

12. The system of claim 7, wherein each of the plurality of publish/subscribe spoke system computer devices comprises a plurality of publish/subscribe message broker computer devices.

13. The system of claim 7, wherein each publish/subscribe spoke system computer device sends and receives messages by way of the publish/subscribe message broker computer device the publish/subscribe spoke system computer device is communicably attached to.

14. A computer program product for publish/subscribe messaging,
the computer program product comprising:
a non-transitory computer-readable storage medium; and
program instructions stored on the non-transitory computer-readable storage medium, the program instructions operable to perform:
attaching a publish/subscribe spoke system to a first publish/subscribe message broker within a hub collective comprising a plurality of publish/subscribe message brokers;
removing the attachment of the publish/subscribe spoke system from the first publish/subscribe message broker within the hub collective;
selecting a second publish/subscribe message broker from available publish/subscribe message brokers within the hub collective, further comprising:
determining a total number of the available publish/subscribe message brokers within the hub collective;
determining a range of Universally Unique Identifier (UUID) hashcodes of publish/subscribe spoke systems attached to the available publish/subscribe message brokers within the hub collective, the range comprising a lowest value of the UUID hashcodes through a highest value of the UUID hashcodes;
computing a distribution of the range of UUID hashcodes over the determined total number of the available publish/subscribe message brokers within the hub collective, the distribution computed so as to attach on average an identical number of publish/subscribe spoke systems to each of the available publish/subscribe message brokers; and
selecting one of the available publish/subscribe message brokers to which the UUID hashcode of the publish/subscribe spoke system is distributed, by the computing, to become the second publish/subscribe message broker; and
automatically attaching the publish/subscribe spoke system to the second publish/subscribe message broker within the hub collective.

15. The computer program product of claim 14, wherein the publish/subscribe spoke system is active when the attachment of the publish/subscribe spoke system is removed from the first publish/subscribe message broker.

16. The computer program product of claim 14, wherein the publish/subscribe spoke system is active when the publish/subscribe spoke system is attached to the second publish/subscribe message broker.

17. The computer program product of claim 14, wherein removing the attachment and selecting the second publish/subscribe message broker occur responsive to a publish/subscribe message broker within the hub collective becoming unavailable.

18. A method for publish/subscribe messaging, comprising:
attaching a publish/subscribe spoke system to a first publish/subscribe message broker within a hub collective comprising a plurality of publish/subscribe message brokers;
removing the attachment of the publish/subscribe spoke system from the first publish/subscribe message broker within the hub collective;
selecting a second publish/subscribe message broker from available publish/subscribe message brokers within the hub collective, further comprising:
determining a Universally Unique Identifier (UUID) hashcode of the publish/subscribe spoke system;
computing a remainder of the UUID hashcode of the publish/subscribe spoke system by dividing the UUID hashcode of the publish/subscribe spoke system by a total number of available publish/subscribe message brokers within the hub collective;
using the computed remainder as an index into an ordered list of UUIDs of the available publish/subscribe message brokers within the hub collective; and
selecting, as the second publish/subscribe spoke system, the one of the available publish/subscribe message brokers to which the index points; and
automatically attaching the publish/subscribe spoke system to the second publish/subscribe message broker within the hub collective.

19. The method according to claim 18, wherein removing the attachment and selecting the second publish/subscribe message broker occur responsive to one of the publish/subscribe message brokers in the hub collective becoming unavailable.

20. The method according to claim 18, wherein removing the attachment and selecting the second publish/subscribe message broker occur responsive to an additional publish/subscribe spoke system being attached to a publish/subscribe message broker in the hub collective.

* * * * *